Feb. 9, 1965
J. W. DAVISON
3,169,052
LOW TEMPERATURE PURIFICATION OF ETHYLENE
Filed June 29, 1962
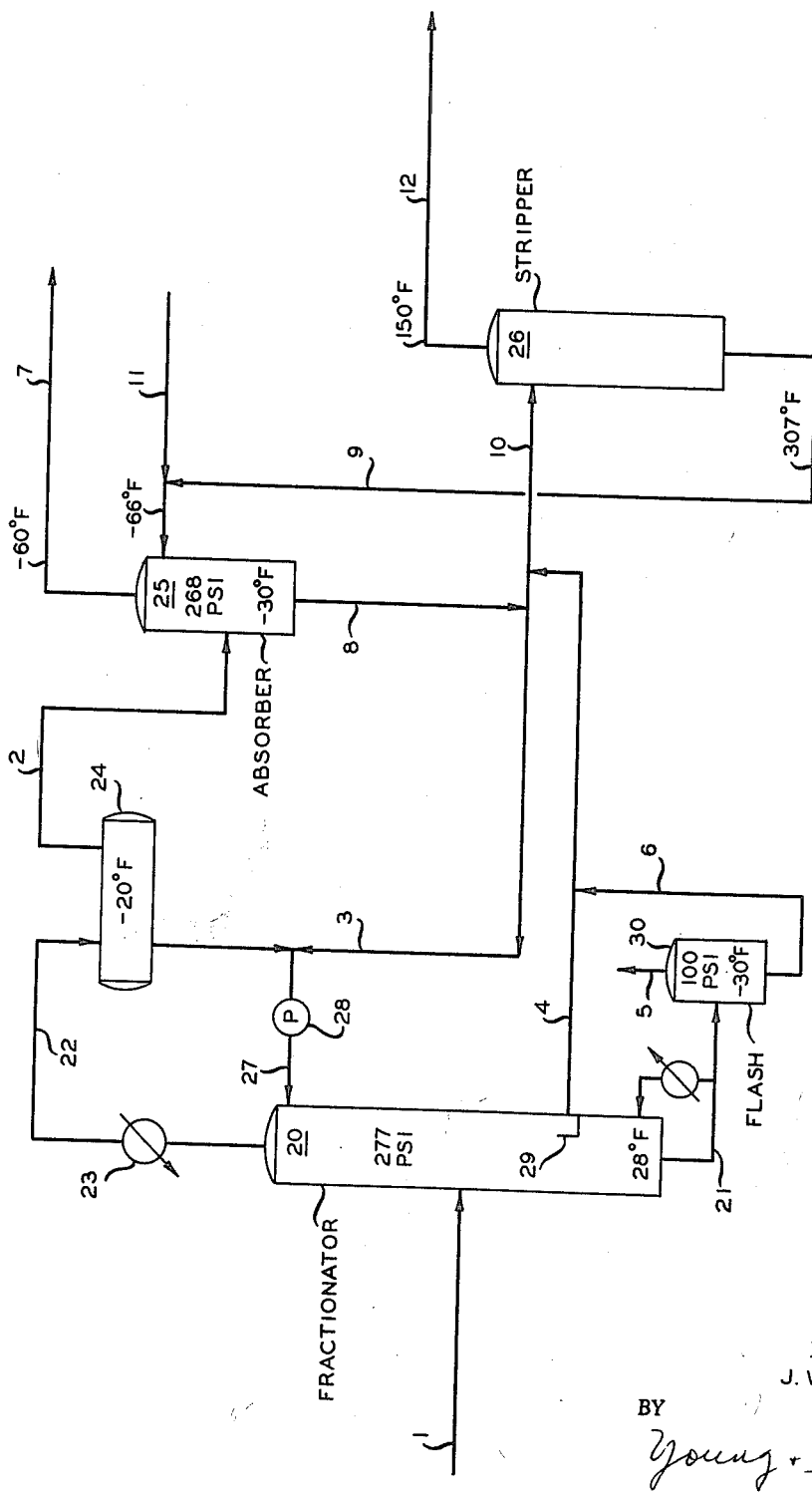
INVENTOR.
J. W. DAVISON
BY
*Young + Dugg*
ATTORNEYS

United States Patent Office 3,169,052
Patented Feb. 9, 1965

3,169,052
LOW TEMPERATURE PURIFICATION OF ETHYLENE
Joseph W. Davison, Bartlesville, Okla., assignor to Phillips Petroleum Company, a corporation of Delaware
Filed June 29, 1962, Ser. No. 206,493
7 Claims. (Cl. 62—20)

This invention relates to low temperature purification of ethylene. In one of its aspects it relates to the fractionation of ethylene to purify the same in an operation in which there is added to the substantially purified ethylene a dehydrating agent to remove water therefrom so that when the ethylene is condensed freeze-up in the condensing system due to formation of hydrate is avoided. In another of its aspects the invention relates to the addition of dimethylformamide to the upper portion of a fractionation zone from which purified ethylene is removed as overhead in order to absorb from said ethylene any moisture contained therein and to retain said moisture in said column so that the overhead ethylene stream can be condensed without difficulties due to the formation of hydrates in the condensing system. In a further aspect of the invention, it relates to apparatus comprising means for the addition of DMF or other dehydrating agent to a fractionation zone in which there is being formed a purified stream, which, if it contains water when it is condensed, will form hydrates or freeze-up in the condensing system.

In the preparation of ethylene for use in various chemical operations, for example, in the preparation of polymers thereof or chemical derivatives therefrom, it is often desirable, if not necessary, to obtain the ethylene in substantially pure form. In one known operation, ethylene is separated from a hydrocarbon stream containing the same, and usually containing also ethane, by a low temperature fractionation from which the ethylene is taken overhead and condensed as a substantially pure stream. In the condensing of the ethylene, when moisture is present there is encountered difficulty due to freeze-up in the condensing system. This freeze-up is due to the formation of a hydrate.

It has now occurred to me that this hydrate formation can be avoided by adding a dehydrating agent to the ethylene stream before it leaves the fractionation zone and that the dehydrating agent should be of such kind and character that it will remain in the fractionation zone so that it can be removed therefrom apart from the overhead stream of pure ethylene. Thus, I have found that dimethylformamide can be added to an upper portion of the fractionation zone, preferably with the reflux stream of condensed pure ethylene, which is added to an upper tray or place in the zone, thus to remove any water or moisture from the rising ethylene gas to retain said water in the fractionation zone and to remove said water from the fractionation zone with the dimethylformamide at a place other than that at which the overhead ethylene stream is removed. The dimethylformamide or other dehydrating agent travels downwardly through the column and is removed from a lower place or level therefrom. For example, part of the dehydrating agent can be trapped out and removed as a separate stream from the column at a place substantially below the place at which it is added, enabling the recovery of the dehydrating agent or dimethylformamide by treatment of a stream containing substantially only dimethylformamide and water. The remaining dehydrating agent is recovered from the fractionator with the bottoms product and separated therefrom by conventional means.

It is an object of this invention to purify a hydrocarbon or other stream to be condensed. It is a further object of this invention to avoid the formation of hydrate in a condensing system in which a purified hydrocarbon or other stream is being condensed. It is a further object of this invention to remove water from a substantially purified stream of ethylene or gas in a purification column, fractionation zone or other piece of equipment.

Other aspects, objects, and the several advantages of this invention are apparent from a study of this disclosure, the drawing, and the appended claims.

According to the present invention, a low temperature condensation of a purified gas which tends to form hydrates and freeze up the system in which it is being condensed is accomplished by contacting said gas with a dehydrating agent prior to the condensing step. Further according to the present invention, a stream of hydrocarbons containing ethylene is separated by fractionation which comprises passing said stream of hydrocarbons into a fractionation zone, developing in said zone a second stream containing substantially only purified ethylene, contacting said second stream in said fractionation zone with dimethylformamide (DMF) in a quantity effective to remove any water therefrom, retaining dimethylformamide (DMF) containing water in said fractionation zone while removing said second stream therefrom, and recovering from said fractionation zone said dimethylformamide containing water as a stream separate from said second stream.

Thus, in one form of the invention, ethylene is separated from ethane in a fractionation zone to the reflux of which there is added dimethylformamide in a quantity sufficient and in a manner such that any moisture or water in the rising ethylene gas in said zone is removed therefrom so that substantially dehydrated ethylene is obtained as an overhead stream which can be condensed without formation of hydrate in the condensing system. In the modus operandi of the invention, a dehydrating agent, preferably dimethylformamide (DMF), is added at that place in the top of the fractionation zone at which the substantially purified rising ethylene gas can be contacted therewith when said rising gas is in effect a purified stream of gas.

Referring now to the drawing, a mixture of ethylene and ethane is passed by 1 into fractionator 20, from which a bottoms consisting largely of ethane and some dimethylformamide is removed at 21. Overhead ethylene is taken off at 22, condensed in condenser 23, and passed to accumulator 24. Uncondensed ethylene passes by 2 to acetylene absorber 25, in which acetylene is removed from ethylene by addition of dimethylformamide at 9. Pure ethylene is recovered at 7. Absorber bottoms 8 containing dimethylformamide and acetylene are divided, part added via 3 to fractionator 20 reflux and the remainder passed to acetylene and water recovery zone 26, from which purified dimethylformamide is withdrawn at 9 and recycled to absorber 25. Condensed ethylene is passed from accumulator 24 by conduit 27 and pump 28 to an upper tray in column 20. There is added, according to the invention, to the ethylene in 27, dimethylformamide, which passes from absorber 25 by way of 8 and 3 to a juncture with 27 just ahead of pump 28. The dimethylformamide is rapidly and intimately and thoroughly disseminated or admixed with the purified ethylene so that there is passed to column 20 a homogeneous mixture of ethylene and dimethylformamide for efficient and rapid removal of water from the rising ethylene in column 20. Dimethylformamide containing water is trapped at trapout tray 29 and passed by 4 to stripper 26 together with streams 8 and 6.

One skilled in the art, in possession of this disclosure, will understand that the drawing which has been described is schematic, or diagrammatic, in character, and is not intended to portray all of the valves, control equipment, pumps, heat exchangers, etc., which one designing a plant to carry out the invention will routinely supply. It will also be understood that although the dimethylformamide is shown added in a preferred manner which is believed inventive in character, it can be added in other manner to tower 20 and still accomplish an embodiment within the broad scope of the invention.

Bottoms 21 from fractionator 20 are flashed into separator 30 from which is obtained an ethane-rich stream 5 overhead and a bottoms 6 rich in dimethylformamide which is added to the stripper feed stream 10. Flash separator 30 operates at sufficient pressure that the overhead ethane can be recycled to cracking steps without additional compression.

The following example presents a material balance for a preferred embodiment of the invention shown in the drawing. The more important operating conditions, i.e., temperatures and pressures, are given on the drawing.

*Example*

| Component | Stream Flows in Pounds per Hour | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Acetylene | 400 | 407 | 7 | | | | 1 | 406 | | 399 | | 399 |
| Ethylene | 28,600 | 28,314 | 14 | | 300 | | 27,502 | 812 | | 798 | | 798 |
| Ethane | 27,000 | 30 | | 6 | 26,941 | 23 | 30 | | | 29 | | 29 |
| Water | 3 | | | 3 | | | | | | 3 | | 3 |
| Dimethylformamide | | Trace | 200 | 50 | 1 | 149 | | 12,000 | 11,998 | 11,999 | 2 | 1 |

Dehydrating agents other than dimethylformamide may be used, for example, alcohols such as methanol, propanol, glycols such as ethylene glycol, diethylene glycol, propylene glycol, glycol ethers such as methyl Carbitol, and others.

Accumulator 24 on ethylene fractionator operates at 277 p.s.i.a. and −20° F. Since ethylene forms a hydrate with water at a temperature of about 50° F. at this pressure, a hydrate would certainly form without my invention.

Reasonable variation and modification are possible within the scope of the foregoing disclosure, drawing, and the appended claims to the invention the essence of which is that in the purification of a gas such as ethylene there is added to the fractionation zone prior to the condensation of said gas after it has been purified a dehydrating agent such as dimethylformamide to remove water from said gas so that a hydrate which it tends to form in the condensing system will not be formed, thus avoiding difficulties due to such hydrate formation.

I claim:

1. A method of separating ethylene from a stream containing it, ethane, and water as an impurity which comprises feeding said stream to a fractionation column being operated at a temperature at which hydrates of ethylene will form, producing and removing from said column an overhead stream consisting essentially of ethylene, contacting said overhead stream while still in said column with dimethylformamide at a point at which said hydrates would normally tend to form in the absence of said dimethylformamide in a manner and quantity sufficient to remove any water from said overhead stream, recovering said overhead stream and condensing at least a portion of the same, passing a portion of condensed ethylene into said column as reflux therefor, and removing a stream of dimethylformamide containing any water absorbed from said overhead stream at a level substantially below the place of said contacting of the DMF with said overhead stream.

2. A method according to claim 1 wherein the dimethylformamide is added to the reflux and the reflux is contacted in said column with said overhead stream.

3. A method according to claim 1 wherein part of the dimethylformamide is removed from said column at a level below said place of contacting but above the place where a liquid level in the bottom of said column tends to form.

4. A method of separating a purified stream of gas from a stream containing it, a second gas, and water as an impurity, which comprises feeding said stream to a fractionation column being operated at a temperature at which hydrates of said purified gas will form, producing and removing from said column an overhead stream consisting essentially of said purified stream of gas, contacting said overhead stream while still in said column with a dehydrating agent at a point at which said hydrates would normally tend to form in the absence of said dehydrating agent in a manner and quantity sufficient to remove any water from said overhead stream, recovering said overhead stream and condensing at least a portion of the same, passing a portion of condensed purified stream into said column as reflux therefor, and removing a stream of dehydrating agent containing water absorbed from said overhead stream at a level substantially below the place of said contacting of said dehydrating agent with said overhead stream.

5. A method according to claim 4 wherein said dehydrating agent is admixed with a portion of said condensed purified stream and the admixture is contacted with said purified stream at said point at which said hydrates would normally tend to form in the absence of said dehydrating agent.

6. A method according to claim 4 wherein liquid in said fractionation column is being reboiled and said dehydrating agent is removed therefrom as a separate stream at a place intermediate the place at which said agent is contacted with said purified stream in said fractionation column and the place at which reboiling of said liquid in said fractionation column is effected.

7. A method according to claim 4 wherein said purified stream of gas is ethylene and said second gas is a hydrocarbon.

References Cited in the file of this patent

UNITED STATES PATENTS

| 2,151,248 | Vaughan | Mar. 21, 1939 |
| 2,324,955 | Rupp et al. | July 20, 1943 |
| 2,445,941 | Dreisbach | July 27, 1948 |
| 2,485,329 | Steele et al. | Oct. 18, 1949 |
| 2,556,030 | Coulter et al. | June 5, 1951 |
| 2,620,895 | Turner | Dec. 9, 1952 |
| 2,758,665 | Francis | Aug. 14, 1956 |
| 2,871,979 | Scofield | Feb. 3, 1959 |
| 2,956,411 | Gilmore | Oct. 18, 1960 |
| 2,993,566 | Griffin | July 25, 1961 |
| 3,038,315 | Colton | June 12, 1962 |

OTHER REFERENCES

Weissberger: Techniques of Organic Chemistry, vol. IV, Distillation, 1951, New York, pp. 9 and 10 relied on.